US009007284B2

(12) United States Patent
Sakurai et al.

(10) Patent No.: US 9,007,284 B2
(45) Date of Patent: Apr. 14, 2015

(54) LIQUID CRYSTAL DISPLAY ELEMENT, LIQUID CRYSTAL DISPLAY DEVICE, AND DISPLAY METHOD EMPLOYED IN LIQUID CRYSTAL DISPLAY ELEMENT

(75) Inventors: Takehisa Sakurai, Osaka (JP); Shuichi Kozaki, Osaka (JP); Shoichi Ishihara, Osaka (JP); Masako Nakamura, Osaka (JP); Mitsuhiro Murata, Osaka (JP); Tadashi Ohtake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 329 days.

(21) Appl. No.: 13/386,991

(22) PCT Filed: Mar. 10, 2010

(86) PCT No.: PCT/JP2010/001711
§ 371 (c)(1),
(2), (4) Date: Feb. 27, 2012

(87) PCT Pub. No.: WO2011/013262
PCT Pub. Date: Feb. 3, 2011

(65) Prior Publication Data
US 2012/0154368 A1    Jun. 21, 2012

(30) Foreign Application Priority Data
Jul. 30, 2009    (JP) ................................. 2009-178337

(51) Int. Cl.
G09G 3/36    (2006.01)
G02F 1/1343    (2006.01)
G02F 1/1362    (2006.01)

(52) U.S. Cl.
CPC .................... *G02F 1/134363* (2013.01); *G02F 2001/134345* (2013.01); *G09G 3/3659* (2013.01); *G09G 2300/0434* (2013.01); *G02F 1/13624* (2013.01)

(58) Field of Classification Search
CPC ................. G09G 2320/0252; G09G 2320/028
See application file for complete search history.

(56) References Cited

U.S. PATENT DOCUMENTS

| 6,525,798 | B1 * | 2/2003 | Yamakita et al. ............. 349/141 |
| 8,217,879 | B2 * | 7/2012 | Chiang et al. .................. 345/93 |
| 2001/0038372 | A1 | 11/2001 | Lee |

(Continued)

FOREIGN PATENT DOCUMENTS

| JP | 6-148596 | 5/1994 |
| JP | 2001-265298 | 9/2001 |

(Continued)

OTHER PUBLICATIONS

International Search Report for PCT/JP2010/001711, mailed May 11, 2010.

*Primary Examiner* — Kwang-Su Yang
(74) *Attorney, Agent, or Firm* — Nixon & Vanderhye P.C.

(57) ABSTRACT

Picture element electrodes (30) and common electrodes (36) are provided in one of two substrates facing each other. Each picture element (20) has a plurality of sub picture elements (22). In a range in which a signal voltage of an image signal is low, a display is carried out only in a first sub picture element (22a) having narrower electrode spacing, whereas in a range in which the signal voltage of the image signal is high, a display is carried out in both of the first sub picture element (22a) and a second sub picture element (22b) having wider electrode spacing.

8 Claims, 9 Drawing Sheets

(56) References Cited

U.S. PATENT DOCUMENTS

2003/0016202 A1* 1/2003 Edwards et al. ............... 345/98
2008/0284929 A1 11/2008 Kimura
2009/0021509 A1* 1/2009 Lee et al. ..................... 345/213
2009/0262056 A1* 10/2009 Yang et al. .................... 345/89

FOREIGN PATENT DOCUMENTS

| JP | 2001-337339 | 12/2001 |
| JP | 2003-207795 | 7/2003 |
| JP | 2008-170482 | 7/2008 |
| JP | 2008-287115 | 11/2008 |

* cited by examiner

| | TYPE | THRESHOLD VOLTAGE (V) |
|---|---|---|
| FIRST, SECOND, AND FIFTH TFTs | n | 5 |
| THIRD TFT | n | 2 |
| FOURTH TFT | p | -2 |

F I G. 6

| TIME | PREVIOUS SCANNING SIGNAL LINE | CURRENT SCANNING SIGNAL LINE | IMAGE SIGNAL LINE | FIRST SUB PICTURE ELEMENT ELECTRODE (P1) | COMMON ELECTRODE INDUCTION SECTION (A) | SECOND SUB PICTURE ELEMENT ELECTRODE (P2) |
|---|---|---|---|---|---|---|
| 0 | 0 | 0 | X | 3 | 3 | 3 |
| 1 | 10 | 0 | 5 | 3 | 0 | 3 |
| 2 | 0 | 10 | 5 | 5 | 5 | 5 |
| 3 | 0 | 0 | X | 5 | 5 | 5 |
| 4 | 10 | 0 | 1 | 5 | 0 | 5 |
| 5 | 0 | 10 | 1 | 1 | 0 | 0 |
| 6 | 0 | 0 | X | 1 | 0 | 0 |
| 7 | 10 | 0 | −5 | 1 | 0 | 0 |
| 8 | 0 | 10 | −5 | −5 | −5 | −5 |
| 9 | 0 | 0 | X | −5 | −5 | −5 |
| 10 | 10 | 0 | −1 | −5 | 0 | −5 |
| 11 | 0 | 10 | −1 | −1 | 0 | 0 |
| 12 | 0 | 0 | X | −1 | 0 | 0 |
| 13 | 10 | 0 | 5 | −1 | 0 | 0 |
| 14 | 0 | 10 | 5 | 5 | 5 | 5 |
| 15 | 0 | 0 | X | 5 | 5 | 5 |

UNIT: (V)

LIQUID CRYSTAL DISPLAY ELEMENT, LIQUID CRYSTAL DISPLAY DEVICE, AND DISPLAY METHOD EMPLOYED IN LIQUID CRYSTAL DISPLAY ELEMENT

This application is the U.S. national phase of International Application No. PCT/JP2010/001711 filed 10 Mar. 2010 which designated the U.S. and claims priority to JP Patent Application No. 2009-178337 filed 30 Jul. 2009, the entire contents of each of which are hereby incorporated by reference.

TECHNICAL FIELD

The present invention relates to a liquid crystal display element, a liquid crystal display device, and a display method employed in the liquid crystal display element, in each of which a response time is short.

BACKGROUND ART

In a filed of liquid crystal display devices, various efforts have been made so as to improve a response speed and a viewing angle characteristic. Together with the efforts, various proposals have been made with respect to a method of generating an electric field for control of alignment directions of liquid crystal molecules and to shapes of picture element electrodes related with the method. Representative examples of the efforts and the proposals are described below.

(Patent Literature 1)

For example, patent literature 1 listed below describes a technique of providing a pair of electrodes in one substrate and generating an electric field in a transverse direction so as to control directions in which liquid crystal molecules are aligned.

Specifically, the patent literature 1 describes a liquid crystal display device in which two signal electrodes are provided in a pixel. Application of different signals to the respective signal electrodes can cause the liquid crystal molecules to be aligned in a direction parallel to the substrate. According to the technique of the patent literature 1, it is possible to generate an electric field greater than an electric field generated in a configuration in which a common electrode is provided in a counter substrate. It is therefore possible to speed up the response speed.

(Patent Literature 2)

Patent literature 2 describes a technique which, in order for a response speed to be improved (i.e. a response time to be shorter) or the like, determines an adjusted data voltage according to comparison of a data voltage in a current frame and a data voltage in a previous frame and applies the adjusted data voltage to a data line.

(Patent Literature 3)

Patent literature 3 describes a technique which, in order for a viewing angle characteristic to be improved, dividing a single pixel (picture element) to different regions to which different voltages are applied. Specifically, the patent literature 3 describes a technique of providing voltage dividing means in the pixel and thereby causing differences in the voltages applied to liquid crystal elements in the respective different regions.

CITATION LIST

Patent Literature 1

Japanese Patent Application Publication, Tokukaihei, No. 6-148596 A (Publication Date: May 27, 1994)

Patent Literature 2

Japanese Patent Application Publication, Tokukai, No. 2001-265298 A (Publication Date: Sep. 28, 2001)

Patent Literature 3

Japanese Patent Application Publication, Tokukai, No. 2008-287115 A (Publication Date: Nov. 27, 2008)

SUMMARY OF INVENTION

Technical Problem

However, the conventional techniques as above have the following problems.

(Patent Literature 1)

In the technique of the patent literature 1, it is required that two signals are supplied to each picture element. Hence, it is required that a signal electrode circuit is two times greater than a conventional signal electrode circuit. Also, in a case where a pixel is divided into sub pixels in order for a viewing angle characteristic to be improved, there is a problem that an aperture ratio is significantly decreased due to the increased number of the electrodes and the increased number of the signal electrode circuits.

Besides obtainment of the improvement in the viewing angle characteristic, spacing between electrodes is set to be small, for example, so as to realize a reduced response time. However, this gives a rise to a problem that the aperture ratio is likely to be further decreased.

(Patent Literature 2)

The technique of the patent literature 2 gives rise to a problem that it is required that a memory for storing a display data in a previous frame is provided.

(Patent Literature 3)

The technique of the patent literature 3 merely causes differences in maximum values of the applied voltage, but does not bring about an effect of shortening a response time.

As described so far, with the conventional techniques, it is difficult to obtain a liquid crystal display device in which shortening of the response time is achieved by a simple configuration.

The present invention is made in view of the problems, and an object of the present invention is to provide a liquid crystal element, a display method, and a liquid crystal display device in each of which a short response time is realized by a simple configuration.

Solution to Problem

In order to attain the object, a liquid crystal display element of the present invention includes two substrates facing each other and a liquid crystal layer sandwiched between the two substrates, picture elements being provided in a matrix manner, picture element electrodes and common electrodes being provided on one of the two substrates, and each of the picture elements being divided into a plurality of sub picture elements, each of the plurality of sub picture elements having different electrode spacing between a corresponding one of the picture element electrodes and a corresponding one of the common electrodes, in a first range in which a signal voltage of an image signal is low, a display being mainly carried out in a sub picture element of the plurality of sub picture elements which has narrower electrode spacing, and in a second range in which the signal voltage of the image signal is high, a display being carried out in the sub picture element which has the narrower electrode spacing and in a sub picture element of the plurality of sub picture elements which has wider electrode spacing.

In order to attain the object, a display method of a liquid crystal display element of the present invention is a display method of a liquid crystal display element, the liquid crystal display element including two substrates facing each other and a liquid crystal layer sandwiched between the two substrates, picture elements being provided in a matrix manner, picture element electrodes and common electrodes being provided in one of the two substrates, and each of the picture elements being divided into a plurality of sub picture elements, each of the plurality of sub picture elements having different electrode spacing between a corresponding one of the picture element electrodes and a corresponding one of the common electrodes, the display method including the steps of: causing, in a first range in which a signal voltage of an image signal is low, a display to be mainly carried out in a sub picture element of the plurality of sub picture elements which has narrower electrode spacing; and causing, in a second range in which the signal voltage of the image signal is high, a display to be carried out in the sub picture element which has the narrower electrode spacing and in a sub picture element of the plurality of sub picture elements which has wider electrode spacing.

With each of the configuration and the method, in the first range in which the signal voltage of the image signal is low, the display is mainly carried out in only the sub picture element of the plurality of sub picture elements which has the narrower electrode spacing, and in the second range in which the signal voltage of the image signal is high, the display is carried out in the sub picture element which has the narrower electrode spacing and in the sub picture element of the plurality of sub picture elements which has the wider electrode spacing.

A comparison of the response time in the sub picture element which has the narrower electrode spacing with the response time in the sub picture element which has the wider electrode spacing demonstrates that the response time is greater in the sub picture element which has the wider electrode spacing than in the sub picture element which has the narrower electrode spacing. This is because, in the sub picture element which has the wider electrode spacing, an intensity of an electric field is weak so that it is difficult to drive liquid crystal molecules. A difference between the response time in the sub picture element which has the wider electrode spacing and the response time in the sub picture element which has the narrower electrode spacing is large in the first range in which the signal voltage of the image signal is low, as compared to a difference between the response times in the respective sub picture elements in the second range in which the signal voltage of the image signal is high.

According to the liquid crystal display element configured as above or the display method arranged as above, in the first range in which the signal voltage of the image signal is low, the display is carried out mainly in only the sub picture element having the narrower electrode spacing. Thus, in the first range in which the signal voltage of the image signal is low, i.e., the range in which the response time is grater in the sub picture element having the wider electrode spacing than in the sub picture element having the narrower electrode spacing, no image display is carried out in the sub picture element having the wider electrode spacing. This causes an improvement in response time in the entire picture element.

With the configuration and the method, it is possible to shorten the response time by simply employing an arrangement in which a sub picture element for carrying out a display is switched between the sub picture elements. Thus, it is less likely that the configuration of the liquid crystal display element and the display method are complex.

According to the configuration, it is thus possible to realize a liquid crystal display element in which the response time can be shortened by a simple configuration. According to the method, it is possible to realize a display method in which the response time can be shortened by a simple configuration.

On the other hand, in the second range in which the signal voltage of the image signal is high, a display is carried out in both of the sub picture element having the narrower electrode spacing and the sub picture element having the wider electrode spacing. This causes an improvement in response time to the display in a broad brightness range (gray scale range).

Because each picture element has both the sub picture element having the narrower electrode spacing and the sub picture element having the wider electrode spacing, it is possible to prevent a decrease in an aperture ratio.

Advantageous Effects of Invention

A liquid crystal display element of the present invention is such that: picture element electrodes and common electrodes are provided on one of the two substrates, each of the picture elements is divided into a plurality of sub picture elements, each of the plurality of sub picture elements has different electrode spacing between a corresponding one of the picture element electrodes and a corresponding one of the common electrodes, in a first range in which a signal voltage of an image signal is low, a display is mainly carried out in a sub picture element of the plurality of sub picture elements which has narrower electrode spacing, and in a second range in which the signal voltage of the image signal is high, a display is carried out in the sub picture element which has the narrower electrode spacing and in a sub picture element of the plurality of sub picture elements which has wider electrode spacing.

A display method of a liquid crystal display element of the present invention is such that picture element electrodes and common electrodes are provided in one of the two substrates, each of the picture elements is divided into a plurality of sub picture elements, each of the plurality of sub picture elements has different electrode spacing between a corresponding one of the picture element electrodes and a corresponding one of the common electrodes, and the display method includes the steps of: causing, in a first range in which a signal voltage of an image signal is low, a display to be mainly carried out in a sub picture element of the plurality of sub picture elements which has narrower electrode spacing; and causing, in a second range in which the signal voltage of the image signal is high, a display to be carried out in the sub picture element which has the narrower electrode spacing and in a sub picture element of the plurality of sub picture elements which has wider electrode spacing.

Thus, it is possible to bring about an effect of providing a liquid crystal display device and a display method in each of which a response time can be shortened by a simple configuration.

BRIEF DESCRIPTION OF DRAWINGS

FIG. 6 is a view showing how electric potentials at respective sections are changed, in accordance with the embodiment of the present invention.

DESCRIPTION OF EMBODIMENTS

Embodiments of the present invention are described in detail below.

Embodiment 1

One embodiment of the present invention is described below with reference to FIGS. 1 through 9.

Figure 1:
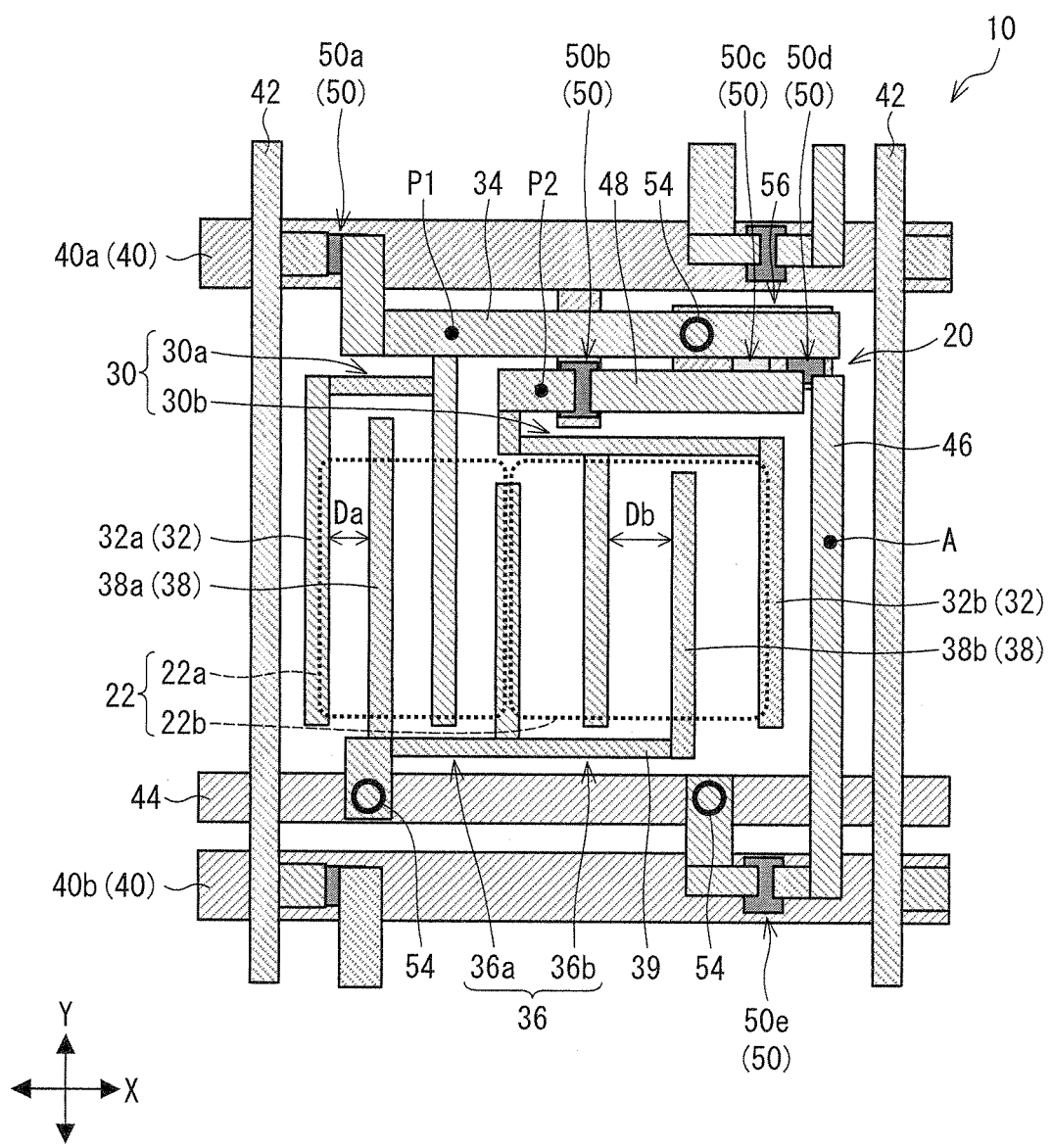
FIG. 1 is a view schematically showing how a liquid crystal display element is configured in accordance with an embodiment of the present invention.

FIG. 1 is a view schematically showing how a liquid crystal display element 10 is configured in accordance with the present embodiment. Specifically, FIG. 1 is a view schematically showing how one of a plurality of picture elements 20 provided in a matrix manner is configured. Particularly, FIG. 1 shows how electrodes and lines are configured in the one of a plurality of picture elements 20.

According to the liquid crystal display element 10 of the present embodiment, the picture element 20 has two regions (see FIG. 1). The two regions are sub picture elements 22.

According to the sub picture elements 22, electrodes having respective combtooth shapes are provided. One of the sub picture elements 22 has wider spacing between teeth of a comb of the electrode, whereas the other of the sub picture elements 22 has narrower spacing between teeth of a comb of the electrode. This is described in detail below.

(Line Configuration)

According to the liquid crystal display element 10 of the present embodiment, the plurality of picture elements 20 having substantially rectangular shapes are provided in the matrix manner. Each of the plurality of picture elements 20 is specified by a region (unit region) defined by (i) corresponding two of scanning signal lines 40 and (ii) corresponding two of image signal lines 42 which extend in a direction perpendicular to a direction in which the scanning signal lines 40 extend and which serves as signal electrode lines.

Specifically, the liquid crystal display element 10 includes two substrates (not shown) between which a liquid crystal layer (not shown) containing liquid crystal molecules is sandwiched. The scanning signal liens 40 and the image signal line 42 are provided in one of the two substrates (hereinafter referred to as an array substrate). In an example shown in FIG. 1, the scanning signal lines 40 are provided so as to extend in a widthwise direction (i.e., a direction indicated by a two-headed arrow X in FIG. 1), and the image signal lines 42 are provided so as to extend in a lengthwise direction (i.e., a direction indicated by a two-headed arrow Y in FIG. 1).

Also, each common electrode line 44 is provided in the array substrate so as to extend in the widthwise direction in which a corresponding one of the scanning signal lines 40 extends.

The picture element 20 of the present embodiment thus has the region roughly defined by the scanning signal lines 40, the image signal lines 42, and the common electrode line 44 (see FIG. 1).

As early described, the picture element 20 of the present embodiment has the two regions, i.e., the two sub picture elements 22, one of which is a first sub picture element 22a and the other of which is a second sub picture element 22b.

As early described, the two sub picture elements 22 are arranged to have the different spacing between teeth of their combs. This is concretely described below.

(Picture Element Electrode)

The picture element 20 of the present embodiment includes five (5) TFTs (Thin Film Transistors) 50 serving as respective switching elements.

A first TFT 50a is a switching element (switching transistor) directly connected with a scanning signal line 40 and a corresponding one of the image signal lines 42. A drain electrode (not shown) of the first TFT 50a is connected with a picture element electrode 30.

The picture element electrode 30 is mainly made up of a first sub picture element electrode 30a provided for the first sub picture element 22a, a second sub picture element electrode 30b provided for the second sub picture element 22b, and a picture element electrode mainline section 34 via which the first sub picture element electrode 30a and the second sub picture element electrode 30b are connected with each other.

Specifically, the drain electrode (not shown) of the first TFT 50a is connected with the picture element electrode mainline section 34. The first sub picture element electrode 30a and the second sub picture element electrode 30b extend from the picture element electrode mainline section 34. Note, here, that devices such as TFTs 50 serving as a second sub picture element control section 56 (i.e., sub picture element control section) is provided between the second sub picture element electrode 30b and the picture element electrode mainline section 34. This is later discussed.

(Picture Electrode Combtooth Section)

The first sub picture element electrode 30a and the second sub picture element electrode 30b are provided so as to have the respective combtooth shapes.

Specifically, the first sub picture element electrode 30a and the second sub picture element electrode 30b have a first sub picture element electrode combtooth section 32a and a second sub picture element electrode combtooth section 32b, respectively. Each of the first and second sub picture element electrode combtooth sections 32a and 32b is a combtooth part in which teeth of a comb are extended in the lengthwise direction from the picture element electrode mainline section 34 which is extended from the first TFT 50a in the widthwise direction.

(Common Electrode)

The following description will discuss a common electrode 36. According to the liquid crystal display element 10 of the present embodiment, the picture element electrode 30 and the common electrode 36 are provided in the array substrate, i.e., one of the two substrates facing each other. It follows that the common electrode 36 and the picture element electrode 30 are provided in the same substrate.

Similarly to the picture element electrode 30, the common electrode 36 is provided so as to have a combtooth shape. This is discussed in detail below.

The common electrode 36 has (i) a common electrode mainline section 39 extending from the common electrode line 44 in the widthwise direction and (ii) a first common electrode combtooth section 38a and a second common electrode combtooth section 38b which are a plurality of combtooth parts extending from the common electrode mainline section 39 in the lengthwise direction.

Note that the common electrode line 44 and the common electrode mainline section 39 are connected via a contact holes 54.

(Matching of Picture Element Electrode and Common Electrode)

According to each of the sub picture elements 22, the picture element electrode 30 and the common electrode 36 are provided so that their combtooth parts match each other. Specifically, the first sub picture element electrode combtooth section 32a and the first common electrode combtooth section 38a match each other in the first sub picture element 22a, whereas the second sub picture element electrode combtooth section 32b and the second common electrode combtooth section 38b match each other in the second sub picture element 22a.

(Electrode Spacing)

Electrode spacing is defined as spacing between respective adjacent teeth of combs of the picture element electrode 30 and the common electrode 36 while the teeth of comb of the picture element electrode 30 and the teeth of comb of the common electrode 36 are matching each other.

According to the liquid crystal display element 10 of the present embodiment, the first sub picture element 22a of the sub picture elements 22 has narrower electrode spacing, and the second sub picture element 22b has wider electrode spacing.

According to the liquid crystal display element 10 of the present embodiment, an area ratio between the first sub picture element 22a and the second sub picture element 22b is approximately 1:1.

Specifically, the electrode spacing between the first sub picture element electrode combtooth section 32a and the first common electrode combtooth section 38a (i.e., first electrode spacing Da shown in FIG. 1) is narrower than the electrode spacing between the second sub picture element electrode combtooth section 32b and the second common electrode comb-like section 38b (i.e., second electrode spacing Db shown in FIG. 1). That is, the first electrode spacing Da is narrower than the second electrode spacing Db.

(Outline of Driving)

According to the liquid crystal display element 10 of the present embodiment, the picture element electrodes 30 and the common electrodes 36 are thus provided in one of the two substrates facing each other. The liquid crystal molecules, which are contained in the liquid crystal layer sandwiched between the two substrates, are driven by a transverse electric field caused by an electric potential difference between the picture element electrodes 30 and the common electrodes 36. Specifically, according to the liquid crystal display element 10, (i) an electrode pair of the picture element electrode 30 and the common electrode 36 is made from transparent conductors provided in an identical layer in the identical substrate, and (ii) display control is carried out by changing directions of the liquid crystal molecules contained in the liquid crystal layer in accordance with a voltage applied between the picture element electrodes 30 and the common electrodes 36, i.e., an electric field caused by the voltage applied between the picture element electrodes 30 and the common electrodes 36.

Note that an alignment mode of the liquid crystal molecules of the liquid crystal display element 10 is not limited to a specific one. In the example, the liquid crystal display element 10 is of a so-called vertical alignment transverse electric field mode which employs an alignment mode in which liquid crystal molecules are vertically aligned while no voltage is being applied.

A dielectric anisotropy of the liquid crystal molecules is not limited to a specific one. On this account, either positive liquid crystal molecules or negative liquid crystal molecules can be employed as the liquid crystal molecules of the liquid crystal display element 10. In the example, positive liquid crystal molecules are employed as the liquid crystal molecules of the liquid crystal display element 10.

(Second Sub Picture Element)

The second sub picture element 22b is described below in more detail.

According to the liquid crystal display element 10 of the present embodiment, the first TFT 50a and four other TFTs 50 (i.e., a second TFT 50b, a third TFT 50c, a fourth TFT 50d, and a fifth TFT 50e) are provided for the second sub picture element 22b. The following description will discuss the second TFT 50b, the third TFT 50, the fourth TFT 50d, and the fifth TFT 50e in this order.

(Second TFT)

A gate electrode (not shown) of the second TFT 50b is connected with a corresponding one of the scanning signal lines 40 (i.e., a current scanning signal line 40a). A drain electrode (not shown) of the second TFT 50b is connected with the second sub picture element electrode 30b. A source electrode (not shown) of the second TFT 50b is connected with a second sub picture element electrode induction section 48.

Note, here, that the second sub picture element electrode induction section 48 is a line connected with drain electrodes (not shown) of the respective third and fourth TFTs 50c and 50d (described below). The second sub picture element electrode induction section 48 extends along the picture element electrode mainline section 34 in the widthwise direction.

(Third and Fourth TFTs)

The third TFT 50c and the fourth TFT 50d are discussed below. A gate electrode (not shown) of the third TFT 50c and a gate electrode (not shown) of the fourth TFT 50d are connected with the picture element electrode mainline section 34. Further, a source electrode (not shown) of the third TFT 50c and a source electrode (not shown) of the fourth TFT 50d are similarly connected with the picture element electrode mainline section 34 via the contact hole 54.

The drain electrode (not shown) of the third TFT 50c and the drain electrode (not shown) of the fourth TFT 50d are connected with the second sub picture element electrode induction section 48.

The third TFT 50c is of an n-type transistor and the fourth TFT 50d is of a p-type transistor. The third transistor 50c and the fourth transistor 50d, in combination, serve as the second sub picture element control section 56. As later described, the second sub picture element electrode control section 56 controls a voltage to be applied to the second sub picture element 22b.

(Fifth TFT)

The fifth TFT 50e is discussed here. The fifth TFT 50e is a switching transistor (i.e., reset transistor). A gate electrode (not shown) of the fifth TFT 50*e* is connected with a corresponding one of the scanning signal lines 40, i.e., a previous scanning signal line 40*b*.

A source electrode (not shown) of the fifth TFT 50*e* is connected with the common electrode line 44 via a contact hole 54. A drain electrode (not shown) of the fifth TFT 50*e* is connected with a common electrode induction section 46.

Note, here, that the common electrode induction section 46, which extends along the image signal lines 42 in the lengthwise direction, is a line via which the fifth TFT 50*e* is connected with the second sub picture element electrode induction section 48.

That is, the second sub picture element electrode induction section 48 connects the drain electrode of the fifth TFT 50*e* with the drain electrode of the third TFT 50*c* and the drain electrode of the fourth TFT 50*d*.

(Equivalent Circuit)

Figure 2:
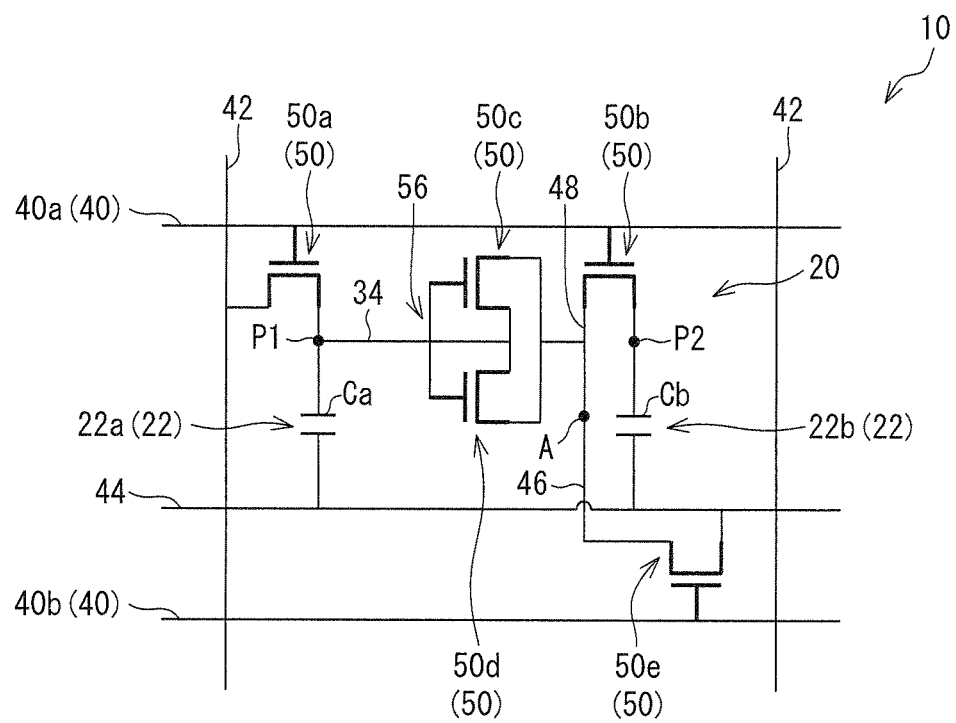
FIG. 2 is a view showing an equivalent circuit of a picture element in accordance with the embodiment of the present invention.

FIG. 2 shows a circuit equivalent to the picture element 20 in accordance with to the present embodiment.

As shown in FIG. 2, the picture element 20 has the two sub picture elements 22, i.e., the first sub picture element 22*a* and the second sub picture element 22*b*. The first sub picture element 22*a* includes a first sub picture element capacitor Ca, and the second sub picture element 22*b* includes a second sub picture element capacitor Cb.

Further, the picture element 20 includes the five (5) TFTs 50, i.e., the first TFT 50*a* through the fifth TFT 50*e*.

The first TFT 50*a*, the second TFT 50*b*, and the fifth TFT 50*e* are transistors driven in response to respective scanning signals. Specifically, the first TFT 50*a* and the second TFT 50*b* out of the first TFT 50*a*, the second TFT 50*b*, and the fifth TFT 50*e* are driven in response to a scanning signal supplied via the scanning signal line 40*a* for a current picture element 20. On the other hand, the fifth TFT 50*e* is driven in response to a scanning signal supplied via the scanning signal line 40*b* for a previous picture element 20 adjacent to the current picture element 20.

On the other hand, the third TFT 50*c* and the fourth TFT 50*d* are transistors driven in response to an image signal. Specifically, the gate electrodes of the third TFT 50*c* and the fourth TFT 50*d* receive, via the drain of the first TFT 50*a*, an image signal supplied via a corresponding one of the image signal lines 42. Thus, the third TFT 50*c* and the fourth TFT 50*d* are driven in response to the image signal.

The drain electrode of the first TFT 50*a* is also connected with the source electrode of the third TFT 50*c* and the source electrode of the fourth TFT 50*d*.

According to the present embodiment, as early described, the pair of the n-type transistor (i.e., the third TFT 50*c*) and the p-type transistor (i.e., the fourth TFT 50*d*) are provided so as to constitute the transistor that connects the first sub picture element 22*a* and the second sub picture element 22*b* and serves the second picture element control section 56.

This is based on the following fact. The liquid crystal element 10 is normally driven by use of an AC driving. Hence, polarities of signal voltages are both positive and negative. In this case, in order for the second sub picture element control section 56 to deal with both of voltages of the positive and negative polarities, it is necessary that the second sub picture element control section 56 has both n-type and p-type characteristics.

However, transistors are generally either p-type transistors that are driven in response to a supplied voltage having a negative polarity or n-type transistors that are driven in response to a supplied voltage having a positive polarity. In view of the fact, the present embodiment employs a pair of the p-type transistor (i.e., the fourth TFT 50*d*) and the n-type transistor (i.e., the third TFT 50*c*). That is, the second sub picture element control section 56 is realized by a complementary transistor made up of the third TFT 50*c* and the fourth TFT 50*d*.

The drain electrodes of the respective third and fourth TFTs 50*c* and 50*d* are connected, together with the drain electrode of the fifth TFT 50*e*, with the source electrode of the second TFT 50*b*. In other words, the drain electrodes of the third TFT 50*c* and the fourth TFT 50*d* are connected with the common electrode induction section 46 and the second sub picture element electrode induction section 48.

The source electrode of the fifth TFT 50*e* is connected with the common electrode line 44. This allows the fifth TFT 50*e* to supply a common electrode electric potential to the source electrode of the second TFT 50*b* in response to the scanning signal supplied via the previous scanning signal line 40*b*.

Then, the second TFT 50*b* supplies a signal voltage of an image signal or the common electrode electric potential to the second sub picture element 22*b* in response to the scanning signal supplied via the current scanning signal line 40*a*

(Outline of Switching of Sub Picture Element)

The following description will discuss how the sub picture elements 22 of the liquid crystal display element are turned on in accordance with the present embodiment.

According to the liquid crystal display element 10, a voltage, which falls within an entire gray scale range, is applied to the sub picture element 22 which has the narrower electrode spacing. In contrast, a voltage, which falls within only a high gray scale range, is applied to the sub picture element 22 which has the wider electrode spacing. That is, an image signal of not more than a given voltage is not applied to the sub picture element 22 which has wider electrode spacing.

Specifically, as later described, in a case where a signal voltage of an image signal is less than a preset threshold voltage, no voltage is applied to the sub picture element 22 which has the wider electrode spacing.

This causes the liquid crystal display element 10 to have improved response time. This is because, in a case where the signal voltage falls within a low gray scale range, a display is carried out only on the sub picture element 22 which has the narrower electrode spacing, i.e., which has shorter response time. This will be described below in more detail.

(Electrode Spacing and Response Time)

Figure 3:
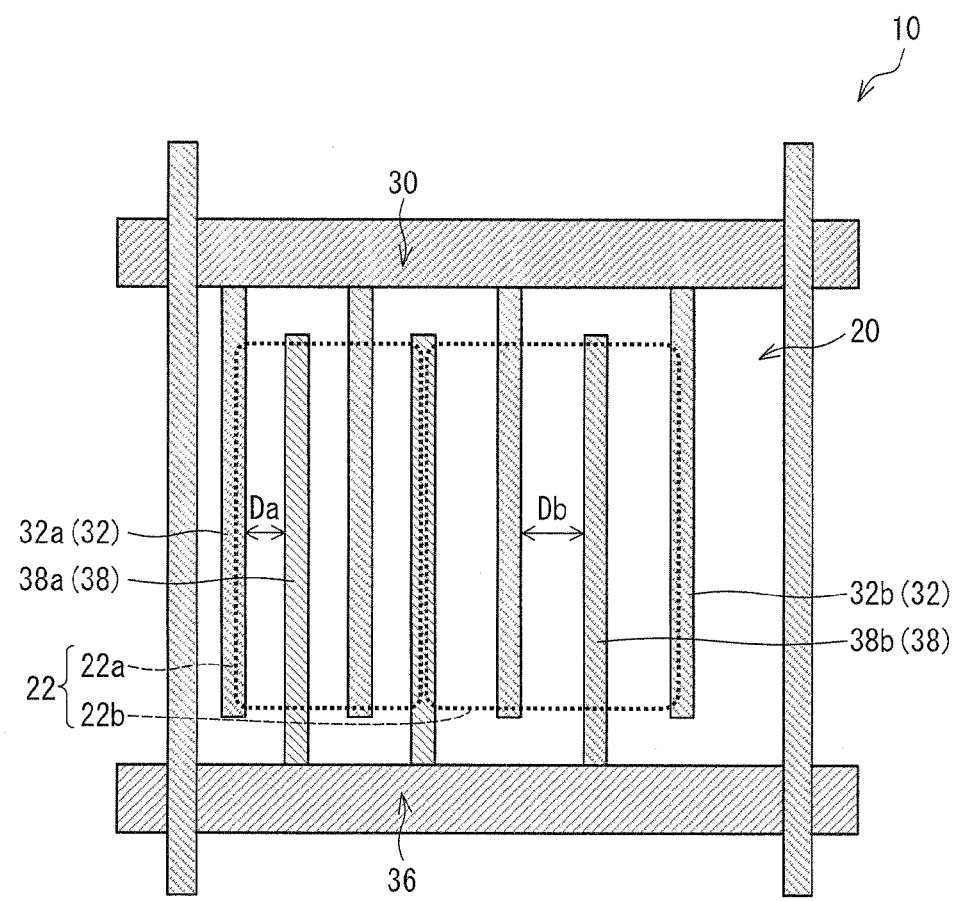
FIG. 3 is a view schematically showing how a liquid crystal display element is configured in accordance with the embodiment of the present invention.

A relationship between the electrode spacing and the response time is first described. FIG. 3 is a view schematically showing the liquid crystal display element 10, and describes the relationship between the electrode spacing and the response time. Specifically, FIG. 3 schematically shows how the picture element electrodes 30 and the common electrodes 36 are provided in the picture element 20.

According to the liquid crystal display element 10 shown in FIG. 3, the picture element 20 has the first sub picture element 22*a* which has the narrower electrode spacing and the second sub picture element 22*b* which has the wider electrode spacing. That is, in FIG. 3, the first electrode spacing Da is smaller than the second electrode spacing Db.

Note that the arrangement, in which the picture element 20 has the sub picture elements 22 in which the electrode spacing is different, is sometimes employed so that a viewing angle characteristic can be improved, for example. In a case where the electrode spacing is different, a relationship between voltage and transmittance varies depending on the electrode spacing. It follows that the picture element 20 has a plurality of regions in each of which a viewing angle characteristic is different. This causes an improvement in viewing angle characteristic of the entire picture element 20.

Figures 4, 5:
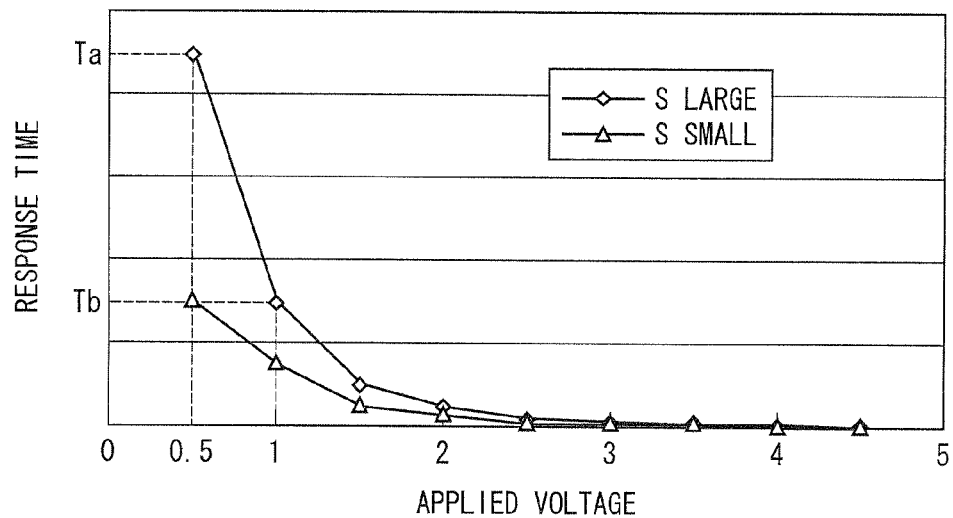
FIG. 4 is a view showing relationships between applied voltages and response times in accordance with the embodiment of the present invention.
FIG. 5 is a view showing threshold voltage characteristics of respective TFTs in accordance with the embodiment of the preset invention.

FIG. 4 is a view showing a relationship between applied voltage ((V)) and response time in each of the first sub picture element 22a and the second picture element 22b of the liquid crystal display element 10 shown in FIG. 3. In FIG. 4, white triangular marks indicate the relationship in the first sub picture element 22a (S (Spacing) small), whereas white trapezoid marks indicate the relationship in the second sub picture element 22b (S (Spacing) large).

FIG. 4 shows, in a low applied voltage range, (i.e., in a low gray scale range), that (i) a difference is large between (a) response time in the first sub picture element 22a which has the narrower electrode spacing and (b) response time in the second sub picture element 22b which has the wider electrode spacing and (ii) the response time is longer in the second sub picture element 22b than in the first sub picture element 22a.

In contrast, in a high-applied voltage range (i.e., the high gray scale range), that the difference between the response time in the first sub picture element 22a and the response time in the second sub picture element 22b is small.

On this account, there is some cases in which entire response time in the one (1) entire picture element 20 becomes long, in a case where (i) one (1) picture element 20 has a plurality of sub picture elements 22 which have different electrode spacing and (ii) a display is carried out in both of the plurality of sub picture elements 22 in the entire gray scale range. This is because the response time in a sub picture element 22 having the wider electrode spacing is long particularly in the low gray scale range.

(Setting of Threshold)

In view of the circumstances, the liquid crystal display element 10 of the present embodiment employs the following countermeasure. Specifically, in the low gray scale range, a display is carried out only in the first sub picture element 22a which has the narrower electrode spacing, as early described. This causes an improvement in response time in the entire picture element 20. This will be described below in detail.

According to the liquid crystal display element 10 of the present embodiment, only in a case where a signal voltage of an image signal is not less than a preset minimum voltage (i.e., threshold voltage), the signal voltage is applied to the second sub picture element 22 which has the wider electrode spacing. In a case where a signal voltage of an image signal is less than the preset minimum voltage, no signal voltage is applied to the second sub picture element 22b which has the wider electrode spacing. That is, 0 V is applied to the second sub picture element 22b which has the wider electrode spacing.

According to the liquid crystal display element 10 of the present embodiment, a voltage to be applied to the second sub picture element 22b is switched between a signal voltage of an image signal and 0 V, i.e., whether the second sub picture element is turned on or not is controlled, by the sub picture element control section which is provided in the picture element 20 so as to serve as the switching element.

Specifically, the second sub picture element control section 56 is provided so as to serve as the sub picture element control section. It has a threshold characteristic in which a signal voltage (i.e., an image signal) is applied to the second sub picture element 22b only in a case where the signal voltage of the image signal is greater than the threshold voltage.

Specifically, according to the liquid crystal display element 10 of the present embodiment, the third TFT 50c and the fourth TFT 50d are provided so as to serve as the second sub picture element control section 56.

(Driving of Present Embodiment)

The following discusses an example of the driving of the liquid crystal element 10 in accordance with the present embodiment. FIG. 5 is a view showing threshold voltage characteristics of the respective TFTs of the liquid crystal display element 10. FIG. 6 is a view showing how the electric potentials at respective different sections in the liquid crystal display element 10 are changed.

According to the liquid crystal display element 10, the first TFT 50a through the third TFT 50c and the fifth TFT 50e are realized by n-type transistors, whereas only the fourth TFT 50d is realized by a p-type transistor (see FIG. 5).

Each threshold voltage (Vth) of the first TFT 50a, the second TFT 50b, and the fifth TFT 50e is 5 V, a threshold voltage (Vth) of the third TFT 50c is 2 V, and a threshold voltage (Vth) of the fourth TFT 50d is −2V.

With reference to FIG. 6, the following description will discuss (i) how electric potentials at respective electric sections are changed and (ii) an outline of the driving. Note that, in FIG. 6, P1 of the first sub picture element electrode 30a corresponds to a point P1 shown in FIGS. 1 and 2, P2 of the second sub picture element electrode 30b corresponds to a point P2 shown in FIGS. 1 and 2, and A of the common electrode induction section 46 corresponds to a point A shown in FIGS. 1 and 2. The outline of the driving is described below in a time-sequential manner.

(Time 0)

Assume that a signal voltage (3 V) of an image signal previously supplied is written into the picture element 20 at the time 0.

(Time 1)

At a time 1, the TFT 50e, whose gate electrode is connected with the previous scanning signal line 40b, is turned on when the electric potential at the previous scanning signal line 40b becomes an on-voltage (10 V).

This causes a change in electric potential at the common electrode induction section 46 (i.e., the location A) into 0 V (which is equal to an electric potential at the common electrode line 44). This is because the source electrode of the fifth TFT 50e is connected with the common electrode line 44.

(Time 2)

At a time 2, the first TFT 50a and the second TFT 50b, whose gates electrodes are connected with the scanning signal line 40a, are turned on when an electric potential at the current scanning signal line 40a becomes an on-voltage (10 V).

This causes a change in electric potential at the first sub picture element electrode 30a (i.e., the point P1) into 5 V which is equal to the signal voltage of the image signal). This is because the source electrode of the first TFT 50a is connected with a corresponding one of the image signal lines 42

Since the signal voltage (5 V) of the image signal is greater than the threshold voltage (2 V) of the third TFT 50c serving as the second sub picture element control section 56, the third TFT 50c is turned on. Since the source electrode of the third TFT 50c is connected with the first sub picture element electrode 30a (i.e., the point P1), the signal voltage (5 V) of the image signal is supplied to the source electrode of the second TFT 50b. Since the second TFT 50b is turned on as described above, the electric potential at the second sub picture element electrode 30b (i.e., the point P2) becomes 5 V, which is the signal voltage of the image signal.

At the time 2, the signal voltage of the image signal is thus supplied to both of the first sub picture element electrode 30a (i.e., the point P1) and the second sub picture element electrode 30b (i.e., the point P2).

In a case where (i) the first and second TFTs 50a and 50b are turned on and (ii) a signal voltage of an image signal is not less than the threshold voltage of the second sub picture element control section 56 (i.e., in a case where an absolute value of the signal voltage of the image signal is not less than absolute values of the respective threshold voltages of the TFTs 50 (i.e., the third TFT 50c and the fourth TFT 50d)), the signal voltage of the image signal is written into the first sub picture element 22a and the second sub picture element 22b.

(Time 3)

When the first TFT 50a and the second TFT 50b are turned off in a case where the electric potentials at the respective scanning signal lines 40a and 40b become 0 V (off-voltage) at time 3, the electric potential at the first sub picture element electrode 30a (i.e., the point P1) and the electric potential at the second sub picture element electrode 30b (i.e., the point P2) are kept to be 5 V.

(Times 4 Through 6)

Times 4 through time 6 relate to a case where the absolute value of the signal voltage of the image signal is less than the absolute values of the respective threshold voltages of the TFTs 50 (i.e., the third TFT 50c and the fourth TFT 50d) serving as the second sub picture element control section 56.

In a case where the absolute value of the signal voltage is less than the threshold voltages of the third and fourth TFTs 50c and 50d, the third TFT 50c and the fourth TFT 50d, serving as the second sub picture element control section 56, are not turned on. This causes the electric potential at the second sub picture element electrode 30b (i.e., the location P2) to become 0 V.

Note, here, that the reason why the electric potential at the second sub picture element electrode 30b (i.e., the point P2) becomes 0 V is that 0 V, which is the common electrode electric potential, is supplied to the common electrode induction section 46 (i.e., the point A) via the common electrode line 44.

That is, the gate electrode of the fifth TFT 50e is connected with the previous scanning signal line 40b, and the source electrode of the fifth TFT 50e is connected with the common electrode line 44. The fifth TFT 50e is turned on in a case where the electric potential at the scanning signal line 40b becomes the on-voltage before the current scanning signal line 40a is scanned. As such, the electric potential at the common electrode induction section 46 (i.e., the point A), which is connected with the drain of the fifth TFT 50e, becomes 0 V, which is an electric potential equal to a common electrode electric potential. 0 V is supplied to the second sub picture element electrode 30b (i.e., the point P2) via the second TFT 50b. This causes the electric potential at the second sub picture element electrode 30b (i.e., the point P2) to become 0 V.

In a case where the signal voltage of the image signal is changed into Low voltage from High voltage, more specifically, in a case where the absolute value of the signal voltage is changed to less than the absolute value of each threshold voltage of the third TFT 50c and the fourth TFT 50d from not less than the absolute value of the each threshold, a previous high electric potential which has been applied to the common electrode induction section 46 (i.e., the point A) remains on the common electrode induction section 46 (i.e., the point A). However, it is possible to make the electric potential at the point A to become 0 V by employing the fifth TFT 50e. It is therefore possible to remove the previous high electric potential remaining at the point A. As such, it is possible that, even in a case where the signal voltage of the image signal is thus changed into Low voltage from High voltage, the electric potential at the second sub picture element electrode 30b (i.e., the point P2) is made to be a desired electric potential such as 0 V while such a Low signal voltage of the image signal is being supplied.

Note that the signal voltage of the image signal is supplied to the first sub picture element electrode 30a (i.e., the point P1), irrespectively of a value of the signal voltage of the image signal. Therefore, the electric potential at the first sub picture element electrode 30a (i.e., the point P1) becomes equal to the signal voltage of the image signal. Specifically, since FIG. 6 shows a case where the signal voltage of the image signal is 1 V, the electric potential at the first sub picture element electrode 30a (i.e., the point P1) becomes 1 V.

In a case where the signal voltage of the image signal is less than the threshold voltage of the second sub picture element control section 56 (i.e., in a case where the absolute value of the signal voltage of the image signal is less than each absolute value of the threshold voltages of the TFTs 50 (i.e., the third TFT 50c and the fourth TFT 50d) serving as the second sub picture element control section 56), the signal voltage of the image signal is thus written only into the first sub picture element 22a but not into the second sub picture element 22b.

Note that the TFTs 50, serving as the second sub picture element control section 56, are made up of the third TFT 50c which is realized by the n-type transistor and the fourth TFT 50d which is realized by the p-type transistor (see FIG. 5). In a case where the signal voltage of the image signal has a positive polarity, the third TFT 50c (i.e., the n-type transistor) controls a supply of the signal voltage to the second sub picture element electrode 30b (i.e., the point P2). On the other hand, in a case where the signal voltage of the image signal has a negative polarity, the fourth TFT 50d (i.e., the p-type transistor) controls a supply of the signal voltage to the second sub picture element electrode 30b (i.e., the point P2).

According to the second sub picture element control section 56 of the present embodiment, the n-type TFT 50 and the p-type TFT are thus provided. It is therefore possible to control the second sub picture element 22b irrespectively of the polarity (either positive or negative) of the signal voltage.

With the configuration, it is possible for the liquid crystal display element 10 of the present embodiment to achieve the following without increasing the number of the image signal lines and without generating a plurality of image signals; only a voltage of not less than the threshold voltage is applied to the sub picture element whose response time is long. This allows an improvement in overall response time.

(Timing)

Figure 7:
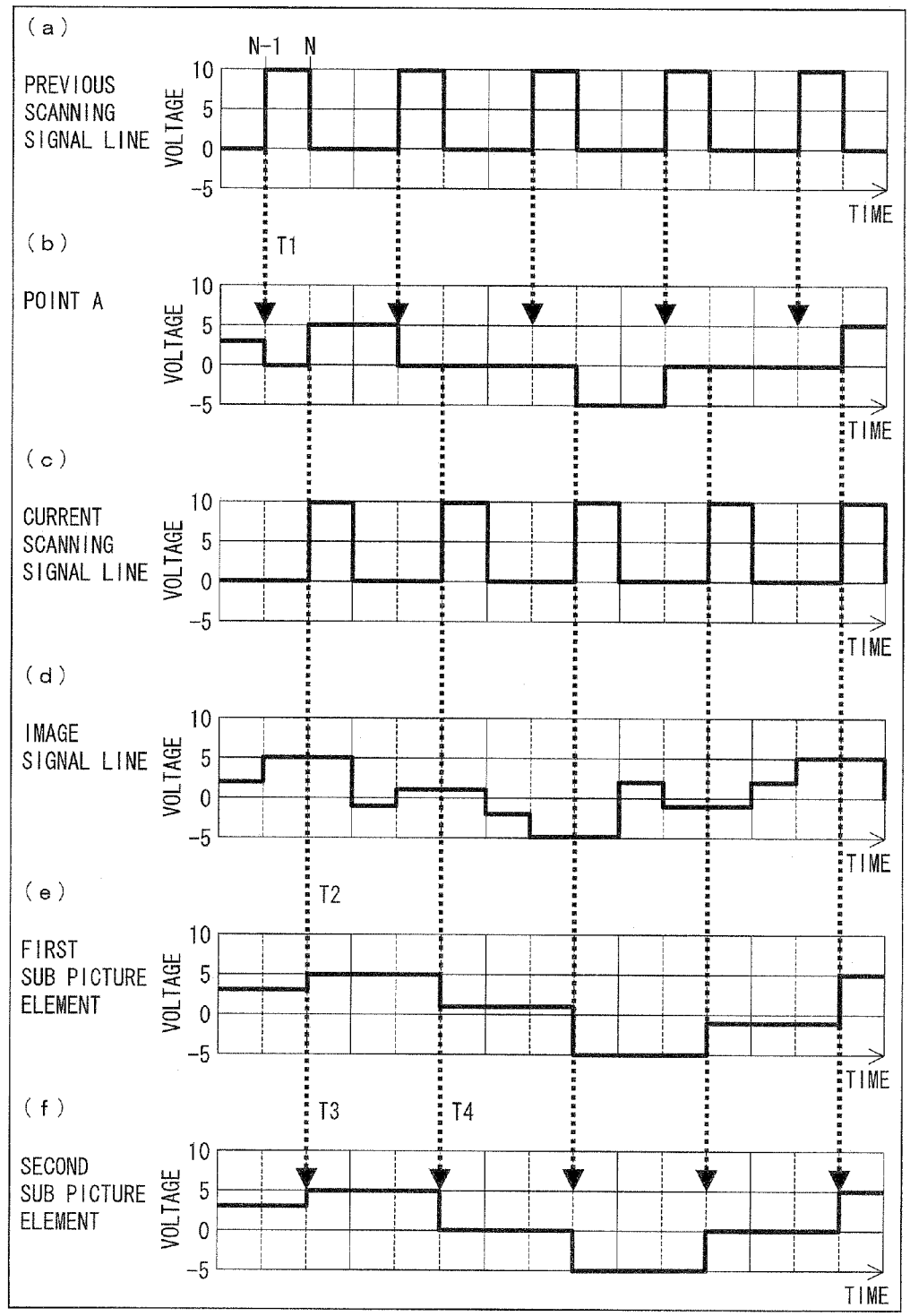
FIG. 7 is a view showing timings at which the liquid crystal display element is driven, in accordance with the embodiment of the present invention.

With reference to (a) through (f) of FIG. 7, the following description will discuss drive timing in the liquid crystal display element 10 of the present embodiment. (a) through (f) of FIG. 7 are views showing the drive timing in the liquid crystal display element in accordance with the present embodiment. For the sake of simplicity, FIG. 7 shows drive timing obtained in a case where there are only three horizontal rows. Specifically, (a) of FIG. 7 shows drive timing of the previous scanning signal line 40b, (b) of FIG. 7 shows drive timing of the common electrode induction section 46 (i.e., the point A), (c) of FIG. 7 shows drive timing of the current scanning signal line 40a, (d) of FIG. 7 shows drive timing of each of the image signal lines 42, (e) of FIG. 7 shows drive timing of the first sub picture element electrode 30a (i.e., the point P1), and (f) of FIG. 7 shows drive timing of the second sub picture element electrode 30b (i.e., the point P2).

(Reset)

As shown in (a) and (b) of FIG. 7, the firth TFT 50e is turned on at timing when the previous scanning signal line 40b becomes the on-voltage (i.e., at timing when the previous scanning signal line 40b is selected). This causes the electric potential at the common electrode induction section 46 (i.e., the point A) to be reset to 0 V (see T1 in (b) of FIG. 7).

This allows the electric potential at the picture element electrode to become 0 V at the timing when the previous scanning signal line 40*b* is selected. As such, it is possible for a voltage of 0 V or of greater than the threshold voltage to be applied to the picture element electrode for each time.

(First Sub Picture Element)

As shown in (c) through (f) of FIG. 7, the first TFT 50*a* is turned on at timing when the current scanning signal line 40*a* become the on-voltage (i.e., at time at which the scanning signal line 40*a* is selected). This causes the signal voltage of the image signal to be written into the first sub picture element electrode 30*a* (i.e., the point P1). That is, the electric potential at the first sub picture element electrode 30*a* becomes a so-called source electric potential (see T2 in (e) of FIG. 7).

(Second Sub Picture Element)

The second TFT 50*b* is turned on at the timing when the current scanning signal line 40*a* becomes the on voltage (i.e., at the timing when the current scanning signal line 40*a* is selected). This causes the electric potential at the second sub picture element electrode induction section 48 (i.e., the electric potential equal to the electric potential at the first common electrode induction 46 (i.e., the point A)) to become equal to the electric potential at the first sub picture element electrode 30*a* (i.e., the point P1).

(Equal to or Greater than Threshold Voltage)

The third TFT 50*c*, or the fourth TFT 50*d* is turned on in a case where the absolute value of the signal voltage of the image signal is not less than the absolute values of the respective threshold voltages of the third TFT 50*c* and the fourth TFT 50*d*.

This causes the electric potential at the second sub picture element electrode induction section 48 to become the electric potential of the image signal, i.e., the source electric potential.

This causes the electric potential at the second sub picture element electrode 30*b* (i.e., the location P2) to become the source electric potential via the second TFT 50*b*, i.e., the electric potential at the second sub picture element electrode induction section 48 (see T3 in (f) of FIG. 7).

(Less than Threshold Voltage)

In contrast, the third TFT 50*c* and the fourth TFT 50*d* are kept to be turned off instead of being turned on in a case where the absolute value of the signal voltage of the image signal is less than the absolute values of the respective threshold voltages of the third TFT 50*c* and the fourth TFT 50*d*.

This causes the electric potential at the second sub picture element electrode induction section 48 to remain at 0 V, i.e., the electric potential at the common electrode 36 (i.e., the common electrode line 44) to which the electric potential at the second sub picture element electrode induction section 48 has been reset via the fifth TFT 50*e*, as early discussed.

This causes the electric potential at the second sub picture element electrode 30*b* (i.e., the point P2) to become 0 V (i.e., the electric potential at the second sub picture element electrode induction section 48) via the second TFT 50*b* (see T4 in (f) of FIG. 7).

(Detail in Configuration)

The following description will discuss the response time of the liquid crystal display element 10 of the present embodiment.

Each electrode spacing in the present embodiment is not particularly limited to a specific one. Examples of the electrode spacing are discussed below.

The picture element electrode combtooth section 32 and the common electrode combtooth section 38 had respective line widths (Lines) of 4 μm, the spacing between the picture element electrode combtooth section 32 and the common electrode combtooth section 38 (i.e., the electrode spacing: Spacing) in the first sub picture element 22*a* was 4 μm, and the electrode spacing between the picture element electrode combtooth section 32 and the common electrode combtooth section 38 in the second sub picture element 22*b* was 12 μm.

(Response Time)

Figure 8:
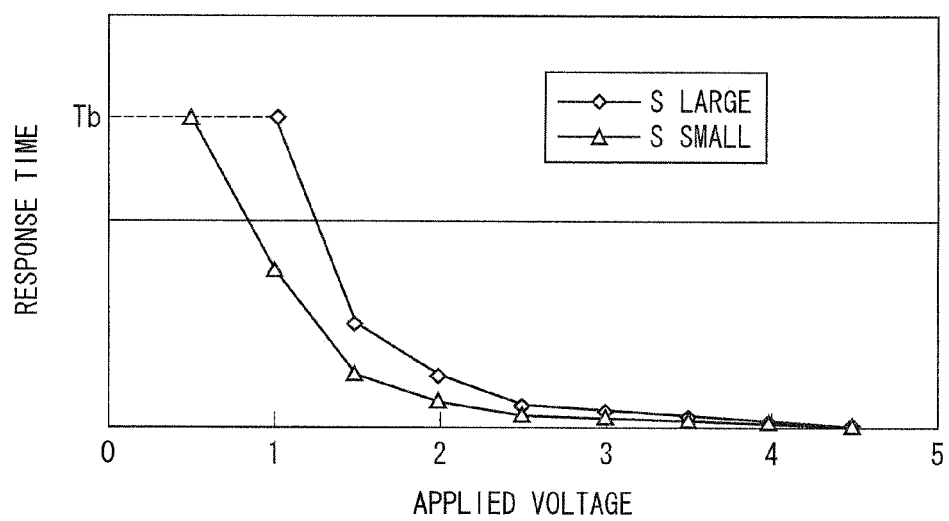
FIG. 8 is a view showing relationships between applied voltages and response times in accordance with the embodiment of the present invention.

FIG. 8 shows how the response time changes in response to the applied voltage in a case where the threshold voltages in the above configuration are set to 1.0 V. FIG. 8 is a view showing a relationship between an applied voltage and a response time in the liquid crystal display device 10. In FIG. 8, similarly to FIG. 4, white triangular marks indicate the relationship in the first sub picture element 22*a* (S (Spacing) small), whereas white trapezoid-shaped marks indicate the relationship in the second sub picture element 22*b* (S (Spacing) large). That is, FIG. 8 is obtained by deleting a line segment of the second sub picture element 22*b* (S (Spacing) large) shown in FIG. 8, which line segment corresponds to a line segment of less than the threshold voltages of 1.0 V.

A maximum response time of the entire picture element 20 was 90 msec (see FIG. 4), in a case where the liquid crystal display element 10 configured as above carried out a display, with the use of the first sub picture element 22*a* and the second sub picture element 22*b*, in the entire applied voltage range, i.e., in the entire gray scale range.

In contrast, it was possible that the entire picture element 22 had response time of not more than 15 msec, in a case where a voltage for driving the second sub picture element 22*b* having the wider electrode spacing was limited to 1.0 V or greater, i.e., in a case where the threshold voltage of the third TFT 50*c* was set to 1.0 V and the threshold voltage of the fourth TFT 50*d* was set to −1.0 V. Furthermore, the entire picture element 22 could respond to the applied voltage within one (I) frame period in the entire gray scale range.

(Threshold Voltage)

Note that there is no specific method of how the threshold voltages are set in the present embodiment. The threshold voltages can be set by, for example, the following method.

Specifically, the threshold voltages can be set so that the maximum response time in the second sub picture element 22*b* having the wider electrode spacing is not greater than the maximum response time in the first sub picture element 22*a* having the narrower electrode spacing. This is discussed below in sequence.

Generally, a response time is longer in a sub picture element 22, which has wider electrode spacing, than in another sub picture element 22 which has narrower electrode spacing, while a transmittance is greater in the sub picture element 22 having the wider electrode spacing than in the sub picture element 22 having the narrower electrode spacing.

Note, however, that the response time in the sub picture element 22 having the wider electrode spacing becomes very long in a case where a low voltage is applied, but becomes short in a case where a high voltage is applied.

Thus, no serious problem occurs in response time in a case where the high voltage is applied, even if both of the sub picture element 22 having the wider electrode spacing and the sub picture element 22 having the narrower electrode spacing are driven by the same signal voltage of the image signal, i.e., even in a case where both of the sub picture elements 22 are driven so as to carry out a display.

In contrast, a response time in an entire picture element becomes longer, in a case where both of the sub picture element 22 having the wider electrode spacing and the sub picture element 22 having the narrower electrode spacing are driven in response to a low voltage so as to carry out a display.

In order to realize the short response time in the entire picture element, it is preferable to drive, in response to the low voltage, only the sub picture element 22 having the narrower electrode spacing without driving (causing alignment the sub picture element having the wider electrode spacing.

That is, the sub picture elements 22 are driven such that (i), when a low voltage is applied, the low voltage is applied only to the sub picture element 22 having the narrower electrode spacing and (ii), when a high voltage is applied, the high voltage is applied to both of the sub picture elements 22. By thus driving the sub picture elements 22, it is possible to carry out a display while keeping the response time to be short.

In order for the sub picture elements 22 to be driven in the above way, it is, for example, preferable that only the sub picture element 22 having the wider electrode spacing has a threshold characteristic. Specifically, it is preferable to carry out control so that a voltage of not more than a given voltage (i.e., a threshold voltage) is not applied to the sub picture element 22 having the wider electrode spacing.

As such, it is preferable to employ a method in which the maximum response time in the sub picture element 22 having the wider electrode spacing is not greater than the maximum response time in the sub picture element 22 having the narrower electrode spacing. The method is discussed below with reference to FIG. 4.

In a case where both of the sub picture elements 22 are driven in the entire gray scale range, i.e., in a case where the signal voltage of the image signal is applied to both of the sub picture elements 22 in the entire voltage range, (i) the maximum response time in the sub picture element 22 having the wider electrode spacing becomes Ta as shown in FIG. 4 and (ii) the maximum response time in the sub picture element 22 having the narrower electrode spacing becomes Tb as shown in FIG. 4.

Since Ta is longer than Tb, as shown in FIG. 4, the maximum response time in the sub picture element 22 having the wider electrode spacing is longer than the maximum response time in the sub picture element 22 having the narrower electrode spacing. Since the response time Ta affects a response time in the entire liquid crystal display element 10, the response time in the entire liquid crystal display element 10 becomes longer.

In a case where the threshold voltage is set to, for example, 1 V, the maximum response time in the picture element 22 having the wider electrode spacing becomes Tb (see FIG. 4). This is because a voltage of less than the threshold voltage is not applied to the sub picture element 22 having the wider electrode spacing.

In a case where the threshold voltage is thus set to 1 V, the maximum response time in the sub picture element 22 having the wider electrode spacing becomes equal to the maximum response time in the sub picture element 22 having the narrower electrode spacing. On this account, the maximum response time in the sub picture element 22 having the wider electrode spacing becomes less than or equal to the maximum response time in the sub picture element 22 having the narrower electrode spacing.

As a result, the response time in the entire liquid crystal display element 10 becomes less than or equal to Tb.

(Entire Configuration)

Figure 9:
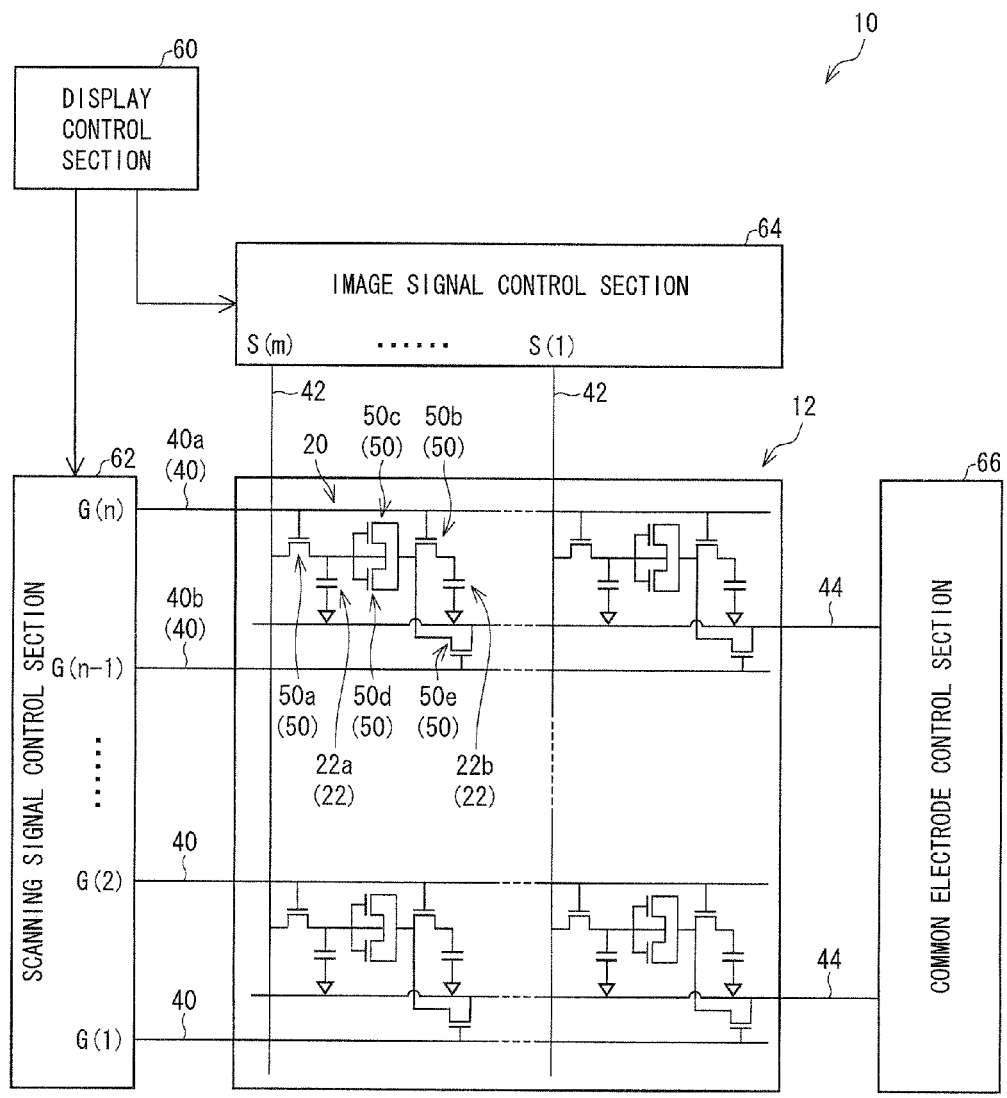
FIG. 9 is a view showing how the entire liquid crystal display element is configured in accordance with the embodiment of the present invention.

With reference to FIG. 9, the following description will schematically describe how the entire liquid crystal element 10 is configured. FIG. 9 is a view schematically showing how the entire liquid crystal display element 10 is configured.

As shown in FIG. 9, the liquid crystal display element 10 of the present embodiment includes (i) a liquid crystal display panel 12 in which picture elements 20 are provided in a matrix manner, (ii) a display control section 60, (iii) a scanning signal control section 62 serving as a gate driver, (iv) an image signal control section 64 serving as a source driver, and (v) a common electrode control section 66. The display control section 60 controls the scanning signal control section 62 and the image signal control section 64.

Each of the sub picture elements 22 is driven in accordance with a corresponding scanning signal sent via the scanning signal control section 62 and a corresponding image signal sent via the image signal control section 64.

Embodiment 2

Figure 10:
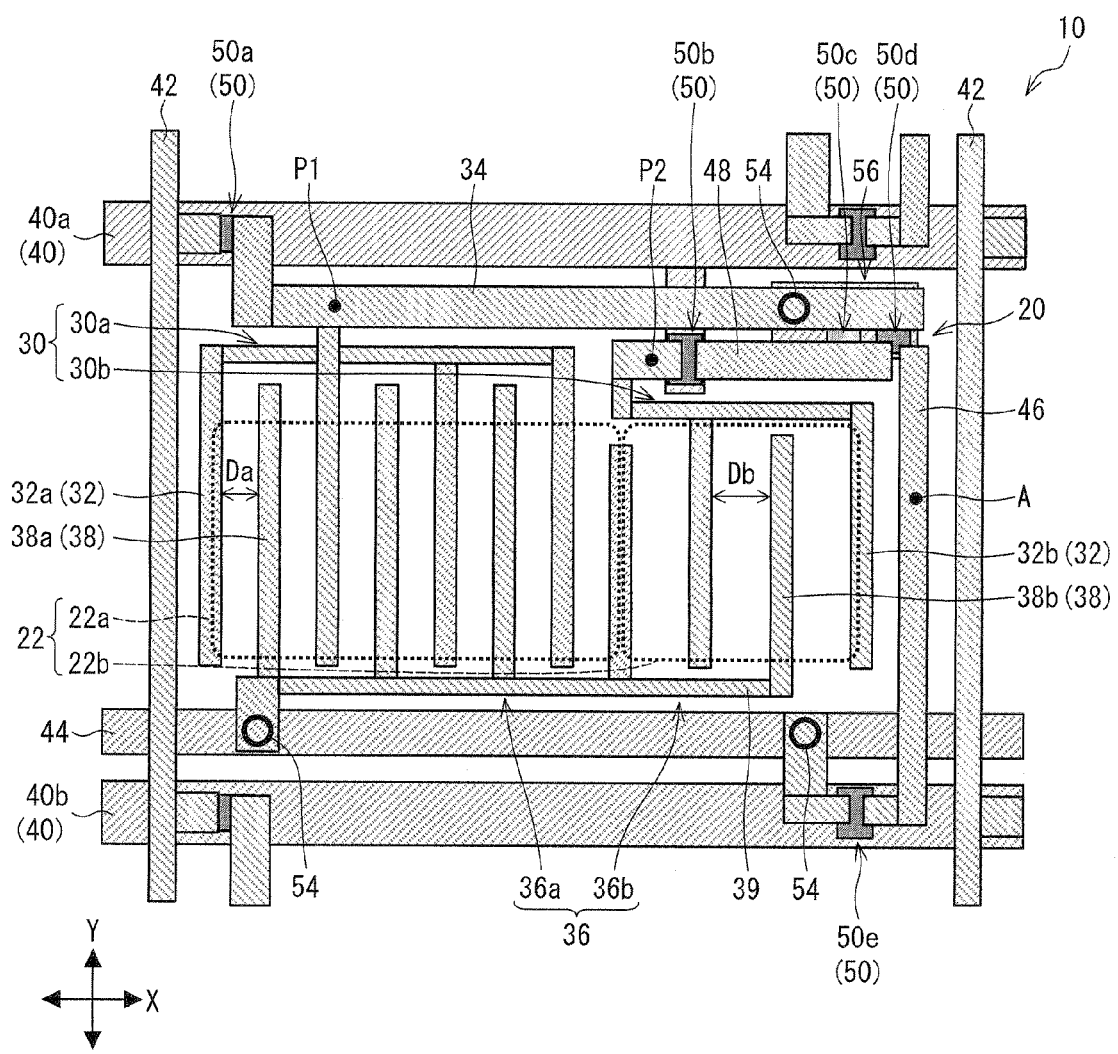
FIG. 10 is a view schematically showing how a liquid crystal display element is configured in accordance with another embodiment of the present invention.

Another embodiment of the liquid crystal display element 10 of the present invention is described below with reference to FIG. 10. FIG. 10 is a view schematically showing how a liquid crystal display element 10 of Embodiment 2 is configured.

For convenience, members having same functions as the members described in Embodiment 1 with reference to the figures are given same reference signs, and their description is omitted.

A liquid crystal display element 10 of the present embodiment has a feature that an area ratio between two sub picture elements 22 is different from the area ratio in the liquid crystal display element 10 of Embodiment 1. That is, according to the liquid crystal display element 10 of Embodiment 1, the area ratio between the first sub picture element 22a and the second sub picture element 22b is 1:1 as shown in FIG. 1. In contrast, according to the liquid crystal display element 10 of the present embodiment, the area ratio between a first sub picture element 22a and a second sub picture element 22b is 2:1.

Since the area ratio between the first sub picture element 22a and the second sub picture element 22b is 2:1, the numbers of teeth of respective sub picture electrodes are different from those in the liquid crystal display element 10 of Embodiment 1.

According to the liquid crystal display element 10 of the present embodiment, (i) the numbers of the teeth of the picture electrode 30 in respective of the first sub picture element 22a and the second sub picture element 22b are two (2) and (ii) the numbers of the teeth of the common electrode 36 in respective of the first sub picture element 22a and the second sub picture element 22b are two (2).

In contrast, according to the liquid crystal display element 10 of Embodiment 2, (i) the numbers of the teeth of respective of the picture element electrode 30 and the common electrode 36 in the second sub picture element 22b are two (2), whereas (ii) the numbers of teeth of respective of the picture element electrode 30 and the common electrode 36 in the first sub picture element 22a are increased. That is, in the first sub picture element 22a, both of the number of teeth of the picture element electrode 30 and the number of teeth of the common electrode 36 are four (4). Specifically, there are provided four (4) teeth in first sub picture element electrode combtooth section 32a and four (4) in the first common electrode combtooth section 38a.

With the configuration, a high transmittance can be ensured on a low gray scale side, although a transmittance becomes low on a high gray scale side. Therefore, by adjusting the area ratio between the first sub picture element 22a and the second sub picture element 22b, it is possible to obtain desired transmittances and desired response characteristics.

Note that the present invention is not limited to the description of each of Embodiments 1 and 2, but may be altered by a skilled person in the art within the scope of the claims. An embodiment derived from a proper combination of technical means disclosed in different embodiments is also encompassed in the technical scope of the present invention.

It is desired that a threshold characteristic, such as a threshold voltage, of each TFT 50 be adjusted based on the spacing, i.e., the electrode spacing, between teeth of combs of respective corresponding electrodes.

Threshold characteristics of respective TFTs 50 can be varied for the respective picture elements 20 by differently constituting the TFTs 50.

Further, drive control over the sub picture elements 22 is not limited to the control by the second sub picture element control section 56. The drive control over the sub picture elements 22 can be realized by a configuration such as a so-called double source in which a plurality of image signal lines 42 are provided for each sub picture element 22, for example. Specifically, by providing a plurality of image signal lines 42 for each sub picture element 22, it is possible to control each sub picture element 22 independently from each other.

Further, the second picture element control section 56 is not limited to the one made up of the n-type TFT 50 and the p-type TFT 50. Alternatively, the second sub picture element control section 56 can be made up of one MIM (Metal Insulator Metal) element, for example. In this case, by the second sub picture element control section 56 thus made up of the one MIM element, it is possible that control similar to one carried out by each of the second sub picture element control sections of the above embodiments is carried out to the second sub picture element 22b irrespectively of a polarity (either positive or negative) of the signal voltage of the image signal.

Further, how the threshold voltages are set is not limited to the method discussed earlier. Any threshold voltages can be set so that a response time suitable for actual use can be secured, for example.

Note that the area ratio between the sub picture elements 22 of the liquid crystal display element 10, the electrode spacing and Line/Space in each sub picture element 22 of the liquid crystal display element 10 can be varied in various ways, because neither of them is particularly limited to the examples discussed earlier.

Further, it is not required that the teeth of combs of the respective electrodes are provided so as to extend in the lengthwise direction (the direction Y) in the example. They can be provided so as to extend in the widthwise direction (the direction X) or an oblique direction, or so that their directions are changed by 90 degrees in each of the sub picture elements.

Further, a liquid crystal mode employed in the liquid crystal display element 10 is not particularly limited. The present invention can be applied to IPS (In Plane Switching), etc, for example.

Further, by using the liquid crystal display elements as a display section, it is possible to make various liquid crystal display devices such as liquid crystal televisions and mobile terminals.

Further, the liquid crystal display element of the present invention is configured so that: a threshold voltage is a voltage corresponding to a boundary between the first range and the second range, and the threshold voltage is set so that maximum response time, obtained when the threshold voltage is supplied, in the sub picture element which has the wider electrode spacing becomes equal to maximum response time in the sub picture element which has the narrower electrode spacing.

According to the configuration, the threshold voltage is set so that the maximum response time in the sub picture element having the wider electrode spacing is not greater than the maximum response time in the sub picture element having the narrower electrode spacing.

In other words, the threshold voltage is set so that the maximum response time in the sub picture element having the wider electrode spacing becomes equal to the maximum response time in the sub picture element having the narrower electrode spacing. This can improve the response time in the entire picture element with certainty. This is discussed below.

The response time is shorter in the sub picture element having the narrower electrode spacing than in the sub picture element having the wider electrode spacing. That is, in a case where the sub picture elements are compared with each other in terms of response time to a same voltage of an image signal, the response time is shorter in the sub picture element having the narrower electrode spacing than in the sub picture element having the wider electrode spacing.

The response times become shorter as the signal voltage of the image signal becomes greater.

On this account, by setting the threshold voltage, which is a minimum voltage for causing the sub picture element having the wider electrode spacing to carry out a display, to such a voltage that the response time in the sub picture element having the wider electrode spacing becomes equal to the maximum response time in the sub picture element having the narrower electrode spacing, it is possible to prevent the maximum response time in the sub picture element having the wider the electrode spacing and longer response time from being longer than the maximum response time in the sub picture element having the narrower electrode spacing and shorter response time.

Thus, it is possible to prevent a display in the sub picture element having the wider electrode spacing and longer response time from contributing to an increase in response time in the entire picture element. It is therefore possible to improve the response time in the liquid crystal display element.

Further, the liquid crystal display element of the present invention is configured so that: a threshold voltage is a voltage corresponding to a boundary between the first range and the second range, and the threshold voltage is set so that maximum response time, obtained when the threshold voltage is supplied, in the sub picture element which has the wider electrode spacing becomes not more than maximum response time in the sub picture element which has the narrower electrode spacing.

Further, the liquid crystal display element of the present invention is configured so that: each of the picture elements includes a sub picture element control section for controlling a supply of the signal voltage of the image signal to the sub picture element which has the wider electrode spacing; and the signal voltage of the image signal is supplied to the sub picture element which has the wider electrode spacing, in a case where the signal voltage of the image signal is not less than a threshold voltage which is a voltage corresponding to a boundary between the first range and the second range, and the signal voltage of the image signal is not supplied to the sub picture element which has the wider electrode spacing, in a case where the signal voltage of the image signal is less than the threshold voltage.

According to the configuration, the sub picture element control section provided in the each of the picture elements controls the supply of the signal voltage of the image signal to the sub picture element having the wider electrode spacing.

It is therefore possible to control the supply of the signal voltage of the image signal to the sub picture element having the wider electrode spacing, without need of providing a particular control mechanism outside a display region or separately supplying an image signal to each sub picture element.

Further, the liquid crystal display element of the present invention is configured so that: the sub picture element control section includes a transistor; the transistor has a gate electrode to which the signal voltage of the image signal is supplied; in a case where the signal voltage of the image signal is not less than the threshold voltage, the signal voltage of the image signal is supplied to the sub picture element which has the wider electrode spacing, via a drain electrode of the transistor, and in a case where the signal voltage of the image signal is less than the threshold voltage, no signal voltage of the image signal is supplied to the sub picture element which has the wider electrode spacing, via the drain electrode of the transistor.

According to the configuration, the sub picture element control section includes the transistor which has a threshold characteristic in accordance with the threshold voltage. That is, in a case where the signal voltage of the image signal is not less than the threshold voltage, the signal voltage of the image signal is supplied, via the transistor, to the sub picture element which has the wider electrode spacing, and in cases other than the above case, no signal voltage of the image signal is supplied to the sub picture element which has the wider electrode spacing.

Thus, according to the configuration, the transistor having the desired threshold characteristic is used as the sub picture element control section, and the signal voltage of the image signal is supplied to the gate electrode of the transistor. With this, it is possible for a simple configuration to realize, with certainty, a control over a display in the sub picture element which has the wider electrode spacing.

Further, the liquid crystal display element of the present invention is configured so that the sub picture element control section is made up of an n-type transistor and a p-type transistor.

According to the configuration, the sub picture element control section is made up of the n-type transistor and the p-type transistor.

Thus, even in a case where the liquid crystal display element is driven by an alternating voltage in view of prevention of image sticking or the like, for example, it is still possible to realize display control in the sub picture element having the wider electrode spacing.

Further, the liquid crystal display element of the present invention is configured so that: the each of the picture elements includes a switching transistor serving as a switching element; scanning signal lines and common electrode lines are provided in the one of the substrates which include the picture element electrodes, so as to correspond to the picture elements provided in the matrix manner; the each of the picture elements further includes a reset transistor for resetting an electric potential at the corresponding one of the picture element electrodes; the reset transistor has a gate electrode connected with a previous scanning signal line which is connected with a switching transistor of a previous picture element which is scanned just before the picture element is scanned; the reset transistor has a source electrode connected with a corresponding one of the common electrode lines; and the electric potential at the corresponding one of the common electrode lines can be supplied to the sub picture element which has the wider electrode spacing, via a drain electrode of the reset transistor.

According to the configuration, when a pixel in a previous horizontal row of a concerned pixel (a current pixel) with respect to a scanning direction is scanned, an electric potential at a common electrode line can be supplied to a sub picture element of the concerned pixel which has the wider electrode spacing.

This brings about the following effect. Specifically, even in a case where the signal voltage of the image signal has been supplied to the picture element of the concerned pixel having the wider electrode spacing during a previous round of scanning of the concerned pixel, it is still possible to reset the image signal (i.e., it is possible to remove a residual electric potential).

Thus, in a case where no display is carried out in this sub picture element of the concerned pixel during a current round of scanning of the concerned pixel (i.e., in a case where the signal voltage of the image signal is less than the threshold voltage), it is possible to make sure that no display is carried out in the sub picture element of the concerned pixel.

Further, a liquid crystal display device of the present invention is configured so that the liquid crystal display element is used as a display section.

According to the configuration, it is possible to provide a liquid crystal display device in which a response time is short.

INDUSTRIAL APPLICABILITY

The present invention is suitably applicable to a display device, such as a liquid crystal display television, for which it is required that a response time be short.

REFERENCE SIGNS LIST

10: liquid crystal display element
20: picture element
22: sub picture element
22a: first sub picture element (sub picture element)
22b: second sub picture element (sub picture element)
30: picture element electrode
30a: first sub picture element electrode (picture element electrode)
30b: second sub picture element electrode (picture element electrode)
32: picture element electrode combtooth section (teeth of comb of picture element electrode)
32a: first sub picture element electrode combtooth section (teeth of comb of picture element electrode)
32b: second sub picture element electrode combtooth section (teeth of comb of picture element electrode)
34: picture element electrode mainline section (picture element electrode)
36: common electrode
36a: first common electrode (common electrode)
36b: second common electrode (common electrode)
39: common electrode mainline section (common electrode)
40: scanning signal line
40a: current scanning signal line (scanning signal line)
40b: previous scanning signal line (scanning signal line)
44: common electrode line
50: TFT (switching element)
50a: first TFT (switching transistor)
50b: second TFT (switching element)
50c: third TFT (transistor)
50d: fourth TFT (transistor)
50e: fifth TFT (reset transistor)
56: second sub picture element control section (sub picture element control section)
Da: first electrode spacing (spacing between picture element electrode and common electrode)
Db: second electrode spacing (spacing between picture element electrode and common electrode)

The invention claimed is:

1. A liquid crystal display element, comprising:
two substrates facing each other and a liquid crystal layer sandwiched between the two substrates, picture elements being provided in a matrix manner,
picture element electrodes and common electrodes being provided on one of the two substrates, and
each of the picture elements being divided into a plurality of sub picture elements,
each of the plurality of sub picture elements having different electrode spacing between a corresponding one of the picture element electrodes and a corresponding one of the common electrodes,
in a first range in which a signal voltage of an image signal is low, a display being mainly carried out in a sub picture element of the plurality of sub picture elements which has narrower electrode spacing, and
in a second range in which the signal voltage of the image signal is high, a display being carried out in the sub picture element which has the narrower electrode spacing and in a sub picture element of the plurality of sub picture elements which has wider electrode spacing,
wherein:
each of the picture elements includes a sub picture element control section for controlling a supply of the signal voltage of the image signal to the sub picture element which has the wider electrode spacing;
the sub picture element control section supplies the signal voltage of the image signal to the sub picture element which has the wider electrode spacing, in a case where the signal voltage of the image signal is not less than a threshold voltage which is a voltage corresponding to a boundary between the first range and the second range, and
the sub picture element control section does not supply the signal voltage of the image signal to the sub picture element which has the wider electrode spacing, in a case where the signal voltage of the image signal is less than the threshold voltage.

2. The liquid crystal display element as set forth in claim 1, wherein:
the threshold voltage is set so that response time, obtained when the threshold voltage is supplied, in the sub picture element which has the wider electrode spacing becomes equal to maximum response time in the sub picture element which has the narrower electrode spacing.

3. The liquid crystal display element as set forth in claim 1, wherein:
the threshold voltage is set so that maximum response time, obtained when the threshold voltage is supplied, in the sub picture element which has the wider electrode spacing becomes not more than maximum response time in the sub picture element which has the narrower electrode spacing.

4. The liquid crystal display element as set forth in claim 1, wherein:
the sub picture element control section includes a transistor;
the transistor has a gate electrode to which the signal voltage of the image signal is supplied;
in a case where the signal voltage of the image signal is not less than the threshold voltage, the signal voltage of the image signal is supplied to the sub picture element which has the wider electrode spacing, via a drain electrode of the transistor, and
in a case where the signal voltage of the image signal is less than the threshold voltage, no signal voltage of the image signal is supplied to the sub picture element which has the wider electrode spacing, via the drain electrode of the transistor.

5. The liquid crystal display element as set forth in claim 4, wherein:
the transistor has a source electrode to which the signal voltage of the image signal is supplied.

6. The liquid crystal display element as set forth in claim 4, wherein:
the sub picture element control section is made up of an n-type transistor and a p-type transistor.

7. The liquid crystal display element as set forth in claim 1, wherein:
the each of the picture elements includes a switching transistor serving as a switching element;
scanning signal lines and common electrode lines are provided in the one of the substrates which include the picture element electrodes, so as to correspond to the picture elements provided in the matrix manner;
the each of the picture elements further includes a reset transistor for resetting an electric potential at the corresponding one of the picture element electrodes;
the reset transistor has a gate electrode connected with a previous scanning signal line which is connected with a switching transistor of a previous picture element which is scanned just before the picture element is scanned;
the reset transistor has a source electrode connected with a corresponding one of the common electrode lines; and
the electric potential at the corresponding one of the common electrode lines can be supplied to the sub picture element which has the wider electrode spacing, via a drain electrode of the reset transistor.

8. A liquid crystal display device, wherein:
the liquid crystal display element recited in claim 1 is used as a display section.

* * * * *